United States Patent
Schoofs

(10) Patent No.: US 8,648,579 B2
(45) Date of Patent: Feb. 11, 2014

(54) SUPPLY CIRCUIT WITH RIPPLE COMPENSATION

(75) Inventor: Franciscus A. C. M. Schoofs, Valkenswaard (NL)

(73) Assignee: ST-Ericsson SA, Plan-les-Ouates (CH)

( * ) Notice: Subject to any disclaimer, the term of this patent is extended or adjusted under 35 U.S.C. 154(b) by 976 days.

(21) Appl. No.: 12/293,411

(22) PCT Filed: Mar. 13, 2007

(86) PCT No.: PCT/IB2007/050850
§ 371 (c)(1),
(2), (4) Date: Jan. 22, 2009

(87) PCT Pub. No.: WO2007/107919
PCT Pub. Date: Sep. 27, 2007

(65) Prior Publication Data
US 2009/0302813 A1    Dec. 10, 2009

(30) Foreign Application Priority Data

Mar. 17, 2006    (EP) ..................................... 06300245

(51) Int. Cl.
  *G05F 1/24*    (2006.01)
(52) U.S. Cl.
  USPC ........................................................ 323/259
(58) Field of Classification Search
  USPC .................. 323/222, 259, 282–285
  See application file for complete search history.

(56) References Cited

U.S. PATENT DOCUMENTS

| 5,668,464 | A | 9/1997 | Krein et al. |
| 5,955,923 | A | 9/1999 | Dijkmans et al. |
| 6,717,389 | B1 | 4/2004 | Johnson |
| 2002/0135339 | A1 | 9/2002 | Tang et al. |
| 2004/0076024 | A1* | 4/2004 | Liu et al. .......................... 363/41 |
| 2005/0286272 | A1* | 12/2005 | Iwamoto et al. ............ 363/21.01 |
| 2007/0114979 | A1* | 5/2007 | Chandrasekaran ........... 323/222 |

FOREIGN PATENT DOCUMENTS

| JP | 62-042437 | 2/1987 |
| JP | 62-171467 | 7/1987 |
| JP | 63153784 U | 10/1988 |
| JP | 05-227649 | 9/1993 |
| JP | 2005-192347 | 7/2005 |

* cited by examiner

*Primary Examiner* — Jue Zhang
(74) *Attorney, Agent, or Firm* — Coats & Bennett, P.L.L.C.

(57) ABSTRACT

A supply circuit (1) comprising an inductor (2) coupled to switching means (7) and comprising a capacitor (4) is provided with an impedance (3) located between the inductor (2) and the capacitor (4), with a current injector (5) and with a feedback loop comprising a converter (6) for controlling the current injector (5) for compensating a ripple in an output voltage across the capacitor (4). The impedance (3) allows injection of a compensating current at a location different from an output location. This increases a number of possible detections of ripples in the output voltage and allows a ripple in an output voltage to be detected even in case of loads introducing much noise across the capacitor (4). The converter (6) detects a detection signal via the impedance (3) by measuring a voltage across the impedance (3) or across a serial circuit comprising the impedance (3) and the capacitor (4). The impedance (3) comprises a resistor or a further inductor.

8 Claims, 5 Drawing Sheets

SUPPLY CIRCUIT WITH RIPPLE COMPENSATION

FIELD OF THE INVENTION

The invention relates to a supply circuit, to a device comprising the supply circuit, to a method for operating the supply circuit and to a computer program product for operating the supply circuit.

Examples of such a supply circuit are switched mode power supply circuits and switching power converters. Examples of such a device are mobile phones and personal computers and further consumer products and non-consumer products.

BACKGROUND OF THE INVENTION

A prior art supply circuit is known from U.S. Pat. No. 5,668,464, which discloses a feed forward active filter for output ripple cancellation in switching power converters. The prior art switching power converter comprises an inductor. A first side of the inductor is coupled to a switch and a second side of the inductor is coupled to a parallel circuit of a capacitor and a load. The switching of the switch results in a ripple voltage present in the output voltage across the capacitor. To compensate for this ripple voltage, the prior art switching power converter comprises complex circuitry for detecting the ripple voltage and for deriving a compensating current from the detected ripple voltage. This complex circuitry comprises for example two integrators, two multipliers and an amplifier. The prior art switching power converter further comprises a transformer for injecting the compensating current into the parallel circuit of the capacitor and the load.

The known supply circuit is disadvantageous, inter alia, owing to the fact that it comprises a resonant injection circuit that may interfere with the load. Further, in case of the load introducing much noise across the capacitor, the ripple voltage might be difficult to detect across this capacitor.

SUMMARY OF THE INVENTION

It is an object of the invention, inter alia, to provide a supply circuit that can detect the ripple voltage across the capacitor even in case the load introduces relatively much noise across this capacitor.

Further objects of the invention are, inter alia, to provide a device comprising a supply circuit that can detect the ripple voltage across the capacitor even in case the load introduces relatively much noise across this capacitor, and to provide a method and a computer program product for operating a supply circuit that can detect the ripple voltage across the capacitor even in case the load introduces relatively much noise across this capacitor.

The supply circuit according to the invention comprises:
an inductor comprising a first electrode coupled to switching means and comprising a second electrode,
an impedance comprising a third electrode coupled to the second electrode and comprising a fourth electrode,
a capacitor comprising a fifth electrode coupled to the fourth electrode and comprising a sixth electrode,
a current injector coupled to the third electrode for compensating a ripple in a voltage signal between the fifth and sixth electrodes, and a feedback loop for detecting a detection signal via the impedance and for supplying a control signal to the current injector and comprising a converter for converting the detection signal into the control signal.

The fifth and sixth electrodes for example constitute outputs of the supply circuit. By injecting a compensating current at a point different from the outputs, the ripple in the output voltage can be detected via the impedance in more than one way. As a result, even in case of the load introducing much noise across the capacitor, the ripple voltage can still be detected, but now via the impedance.

The current injector for example comprises a current source in the form of a push-pull amplifier such as disclosed in U.S. Pat. No. 5,955,923, without excluding other kinds of amplifiers and other kinds of current sources. Alternatively, the current injector might comprise a transformer. The detection signal for example comprises a further voltage signal, without excluding other kinds of detection signals such as magnetic fields etc.

An embodiment of the supply circuit according to the invention is defined by inputs of the feedback loop being coupled to the third electrode and to the fourth electrode or the sixth electrode. In this case, the ripple in the output voltage is detected by either measuring for example a voltage across the impedance or measuring for example a voltage across a serial circuit of the impedance and the capacitor.

The impedance for example comprises a resistor or a track on a circuit board having a resistance. However, in that case, a DC voltage will be present across this impedance that needs to be filtered since the AC voltage across the impedance is to be used for the compensation feedback loop. Alternatively, an amplifier may be used followed by a high pass filter for amplifying the voltage across the impedance and then high pass filtering the amplified voltage for removing the DC component, or a high pass filter may be used followed by an amplifier for high pass filtering the voltage across the impedance for removing the DC component and then amplifying the filtered voltage etc. Further, the impedance in the form of a resistor or a resistance will dissipate power.

The supply circuit according to the invention might be further improved by coupling a filtering capacitor to the third and sixth electrodes. Such a filtering capacitor may have a smaller value than the capacitor as to filter high frequency noise originating from the load.

An embodiment of the supply circuit according to the invention is defined by the impedance comprising a further inductor. In this case, the DC voltage will be smaller across the impedance, and the dissipation of power will be smaller, compared to using an impedance in the form of a resistor or a resistance. The impedance in the form of the further inductor comprises for example an inductor or a track on a circuit board having an inductance.

An embodiment of the supply circuit according to the invention is defined by the converter comprising an amplifier for amplifying the detection signal and comprising a rectifier for rectifying the amplified detection signal and comprising an integrator for integrating the rectified amplified detection signal, the control signal comprising the integrated rectified amplified detection signal. This is a low complex feedback loop.

An embodiment of the supply circuit according to the invention is defined by the rectifier comprising a multiplier for multiplying the amplified detection signal with a duty cycle signal. This is a low complex rectifier.

In general, linear (analog) multipliers will increase the complexity of the supply circuit compared to digital multipliers, owing to the fact that these linear (analog) multipliers may suffer from DC offset problems. Full digital multipliers do not suffer from DC offset problems but require timing. Synchronous rectifiers can multiply an analog signal with a digital signal and thus are less sensitive to offset than a linear multiplier. With synchronous rectification, timing aspects are also involved. With synchronous rectification, the impedance will preferably be in the form of the further inductor, since otherwise, in case of the impedance being in the form of the resistor, further signal processing such as phase shifting will need to be performed on behalf of the timing of the digital multiplier, owing to the fact that the voltage across and the current through the resistor are in phase.

An embodiment of the supply circuit according to the invention is defined by the integrator comprising a multiplier for multiplying the rectified amplified detection signal with a saw tooth signal. This is a low complex integrator.

An embodiment of the supply circuit according to the invention is defined by the converter further comprising one or more high pass filters for filtering the detection signal and/or for filtering the amplified detection signal. Such a high pass filter improves the performance of the feedback loop. Further filters, such as low pass filters and band pass filters, are not to be excluded.

An embodiment of the supply circuit according to the invention is defined by the switching means comprising transistors and the supply circuit being a switched mode supply circuit.

Embodiments of the device according to the invention and of the method according to the invention and of the computer program product according to the invention correspond with the embodiments of the supply circuit according to the invention.

The invention is based upon an insight, inter alia, that a load of a supply circuit might introduce so much noise across an output capacitor of the supply circuit that a ripple voltage across this capacitor is difficult to detect, and is based upon a basic idea, inter alia, that a compensating current is to be injected at a point different from the electrodes of the output capacitor.

The invention solves the problem, inter alia, to provide a supply circuit that can detect the ripple voltage across the output capacitor even in case the load introduces relatively much noise across this output capacitor, and is advantageous, inter alia, in that the ripple voltage in the output voltage can be detected in more than one way.

These and other aspects of the invention will be apparent from and elucidated with reference to the embodiment(s) described hereinafter.

DETAILED DESCRIPTION OF THE EMBODIMENTS

Figure 1:
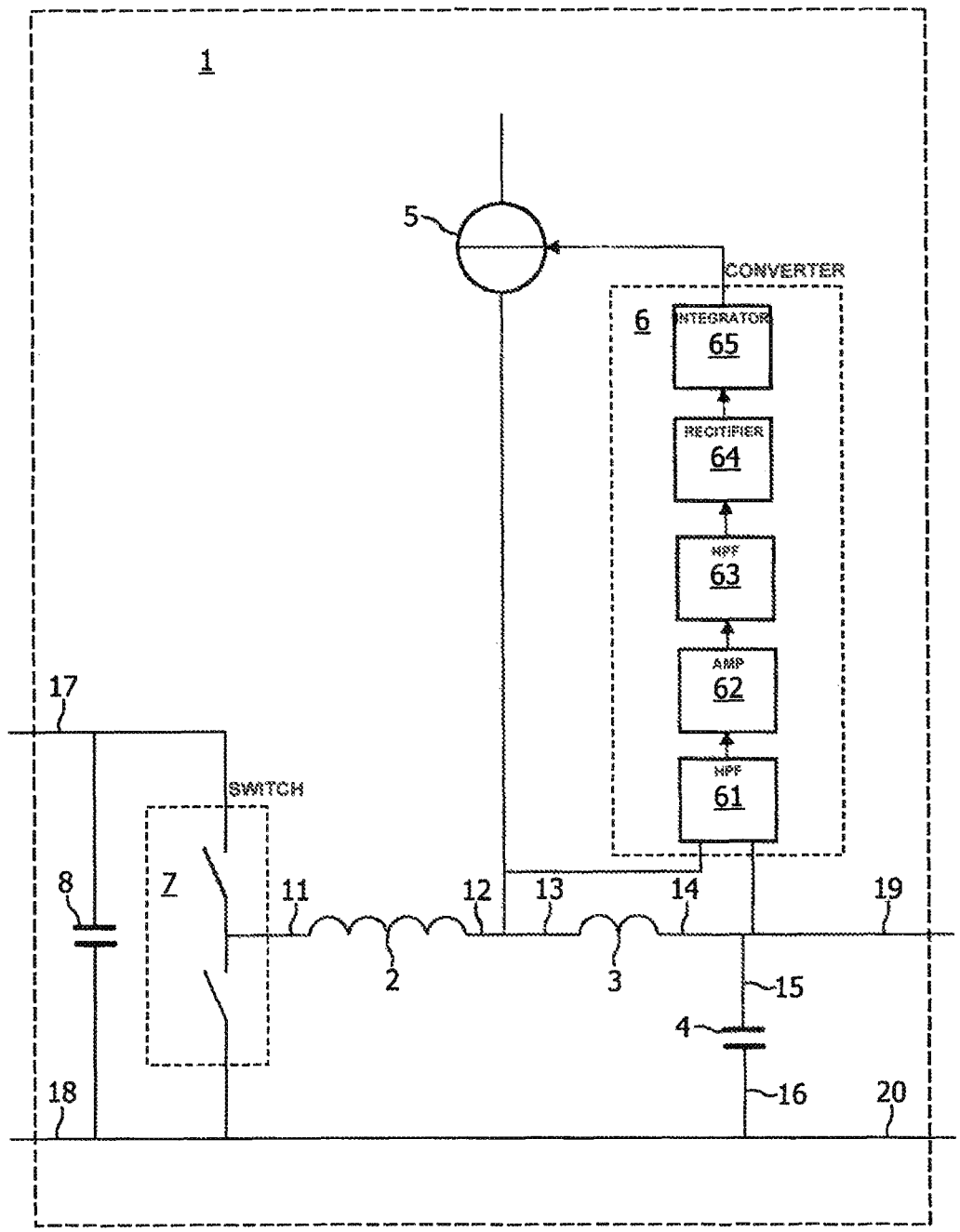
FIG. 1 shows diagrammatically a supply circuit according to the invention.

The supply circuit 1 according to the invention shown in FIG. 1 comprises an inductor 2 with a first electrode 11 coupled to switching means 7 and with a second electrode 12 and comprises an impedance 3 with a third electrode 13 coupled to the second electrode 12 and with a fourth electrode 14 and comprises a capacitor 4 with a fifth electrode 15 coupled to the fourth electrode 14 and with a sixth electrode 16. The switching means 7 comprise a first switch coupled to the first electrode 11 and to an input electrode 17 and comprise a second switch coupled to the first electrode 11 and to a further input electrode 18. Between the input electrodes 17 and 18, a further capacitor 8 is present, to for example smoothen a rectified AC voltage signal offered at the input electrodes 17 and 18. The switching means 7 are operated in a way common in the art, whereby, for example, in a first mode the first switch may be in a conducting state and the second switch may be in a non-conducting state, and in a second mode the first switch may be in a non-conducting state and the second switch may be in a conducting state etc. The switches for example comprise transistors and the supply circuit 1 for example is a switched mode (power) supply circuit.

The supply circuit 1 according to the invention also comprises a current injector 5 coupled to the third electrode 13 for compensating a ripple in a voltage signal across the capacitor 4 between the fifth and sixth electrodes 15,16, and comprises a feedback loop for detecting a detection signal via the impedance 3 and for supplying a control signal to the current source 5. This feedback loop comprises a converter 6 for converting the detection signal into the control signal. In other words, one of the inputs of the converter 6 is coupled to one of the electrodes 13 and 14. The fourth and fifth electrodes 14 and 15 are further coupled to an output electrode 19, and the sixth electrode 16 is further coupled to the further input electrode 18 and to a further output electrode 20.

By letting the current injector 5 inject a compensating current at a point different from the outputs constituted by for example the electrodes 15 and 16 (19 and 20), the ripple in the output voltage across the capacitor 4 can be detected in more than one way. As a result, even in case of the load introducing much noise across the capacitor 4, the ripple voltage can still be detected, but now via the impedance 3. The current injector 5 for example comprises a push-pull amplifier such as disclosed in U.S. Pat. No. 5,955,923, without excluding other kinds of amplifiers and other kinds of current sources. Alternatively, the current injector 5 might comprise a transformer. The current injector 5 injects a positive current or a negative current. An injection of a negative current of course corresponds with an extraction of a positive current etc. The detection signal for example comprises a further voltage signal, without excluding other kinds of detection signals such as magnetic fields etc.

Preferably, inputs of the feedback loop are coupled to the third electrode 13 and to the fourth electrode 14 or the sixth electrode 16. In other words, the inputs of the converter 6 are preferably coupled to the third electrode 13 and to the fourth or sixth electrode 14 or 16. In this case, the ripple in the output voltage is detected by either measuring for example a voltage across the impedance 3 or measuring for example a voltage across a serial circuit of the impedance 3 and the capacitor 4.

The impedance 3 for example comprises a resistor or a track on a circuit board having a resistance. However, in that case, a DC voltage will be present across this impedance that needs to be filtered since the AC voltage across the impedance is to be used for the compensation feedback loop. Alternatively, an amplifier may be used followed by a high pass filter for amplifying the voltage across the impedance and then high pass filtering the amplified voltage for removing the DC component, or a high pass filter may be used followed by an amplifier for high pass filtering the voltage across the impedance for removing the DC component and then amplifying the filtered voltage etc. Further, the impedance 3 in the form of a resistor or a resistance will dissipate power.

The supply circuit 1 according to the invention might be further improved by coupling a filtering capacitor to the third and sixth electrodes 13 and 16. Such a filtering capacitor may have a smaller value than the capacitor as to filter high frequency noise originating from the load.

Preferably, the impedance 3 comprises a further inductor, to avoid that a DC voltage will be present across the impedance 3 (in an ideal situation) and to avoid that power is dissipated (again in an ideal situation).

The converter 6 comprises a high pass filter 61 with an input for example coupled to the third and fourth electrodes 13 and 14 for filtering the detection signal and with an output coupled to an input of an amplifier 62 for amplifying the detection signal. An output of the amplifier 62 is coupled to an input of a further high pass filter 63 for further filtering the amplified detection signal, and an output of this further high pass filter 63 is coupled to an input of a rectifier 64 for rectifying the amplified signal. An output of the rectifier 64 is coupled to an input of an integrator 65 for integrating the rectified and amplified signal, and an output of the integrator 65 is coupled to a control input of the current injector 5 for supplying a control signal to the current injector. This control signal comprises the integrated and rectified and amplifier (and (further) filtered) signal.

Preferably, the rectifier 64 comprises a multiplier for multiplying the amplified detection signal with a duty cycle signal, and the integrator 65 comprises a multiplier for multiplying the rectified amplified detection signal with a signal similar to a wave shape of a current in the inductor, for example a saw tooth signal derived from the duty cycle signal.

Figure 2:
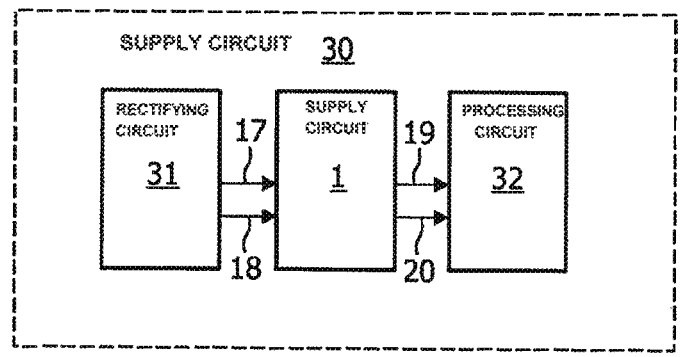
FIG. 2 shows diagrammatically a device according to the invention.

The device 30 according to the invention shown in FIG. 2 comprises a circuit 31 for supplying for example a rectified AC signal. An output of this circuit 31 is coupled to the input electrodes 17 and 18 of the supply circuit 1, and the output electrodes 19 and 20 of the supply circuit 1 are coupled to an input of a circuit 32 for receiving, processing and/or transmitting signals. In this case the supply circuit 1 performs down converting or buck converting. Alternatively, the supply circuit 1 may perform up converting or boost converting. In that case, the electrodes 19 and 20 constitute the inputs and the electrodes 17 and 18 constitute the outputs.

Figure 3:
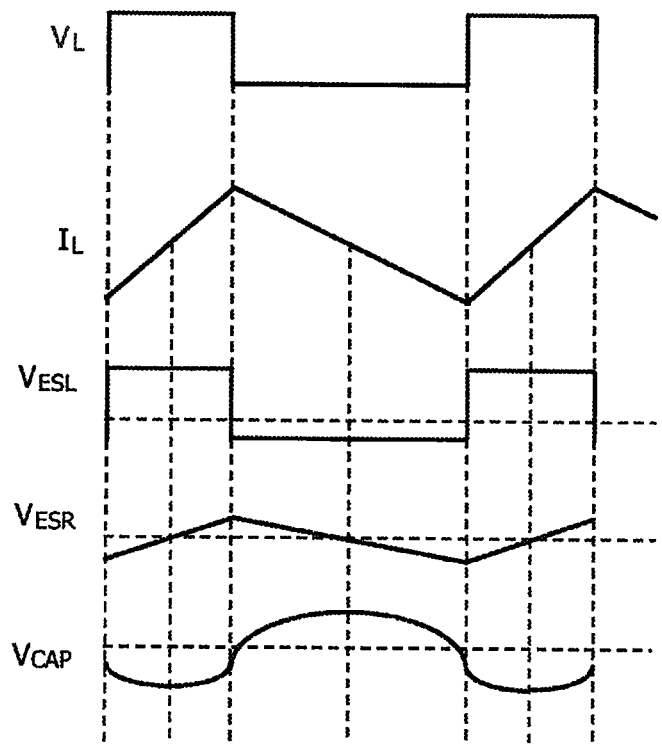
FIG. 3 shows a voltage across an inductor of a supply circuit and a resulting current through the inductor of the supply circuit and resulting voltages across parts of a capacitor.

In FIG. 3, a voltage across the inductor 2 of a supply circuit and a resulting current through the inductor 2 of this supply circuit and resulting voltages across parts of the capacitor 4 are shown. The parts of the (non-ideal) capacitor 4 for example comprise an equivalent serial resistance ESR, an equivalent serial inductance ESL, and a wanted capacitance CAP. A sum of the voltages across these three parts forms a ripple that is to be compensated.

Figure 4:
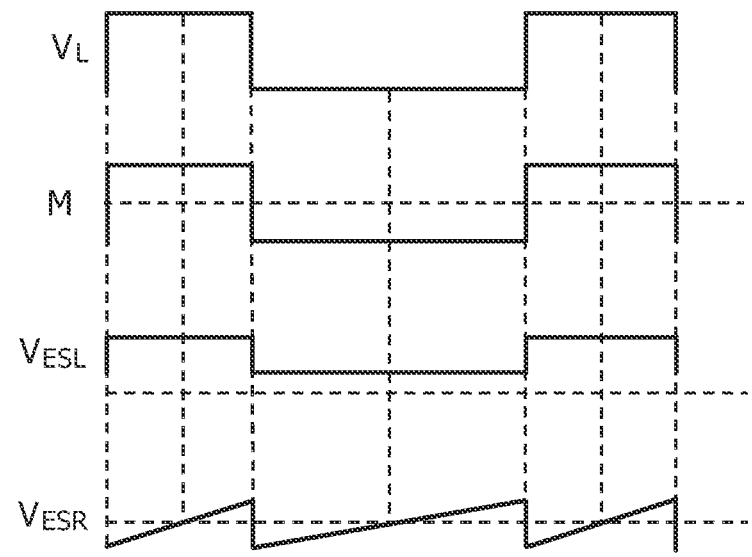
FIG. 4 shows examples of synchronous rectification to be performed in a converter of a supply circuit.
Figure 4:
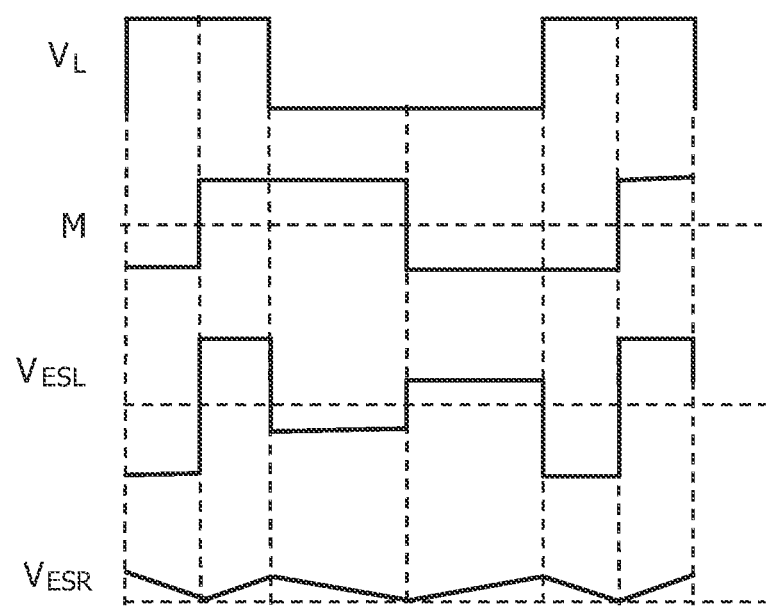

In FIG. 4, examples of synchronous rectification to be performed in the converter 6 of a supply circuit are shown. For a particular voltage across the inductor 2 in combination with a switching signal M, resulting voltages derived from the ESR and ESL contributions are shown. Horizontal dashed lines indicate zero levels. M=+1 or −1. So, in other words, in FIG. 4, the impact of the timing of the multiplication of the signals detected across an impedance such as a resistance or an inductance is shown.

Thereto, the ripple is multiplied with a signal related to a duty-cycle of the switching means 7. This operation is also called synchronous multiplication and can be performed by for example using Gilbert cells. As a result, signals that are correlated with the duty cycle such as the ripple can be distinguished from other non-correlated signals as for example output noise resulting from the load. In the upper graphs of FIG. 4, the switching signal M is derived from the voltage across the inductor 2 in a non-phase shifted way, in the lower graphs of FIG. 4 the switching signal M is derived from the voltage across the inductor 2 in a phase shifted way (M changes its sign at middle points of extreme values of the voltage across the inductor 2).

A synchronous multiplier such as a rectifier in case of the multiplication factor of the switching signal M being +1/−1 implements a narrow band-pass filter that eliminates signals other than those correlated to the switching signal. As a result, noise signals at the output of the supply circuit that are caused by the load do no longer have any influence on the compensation of the ripple. Simulation results in FIG. 5 show that synchronous rectification can yield a DC signal.

Figure 5:
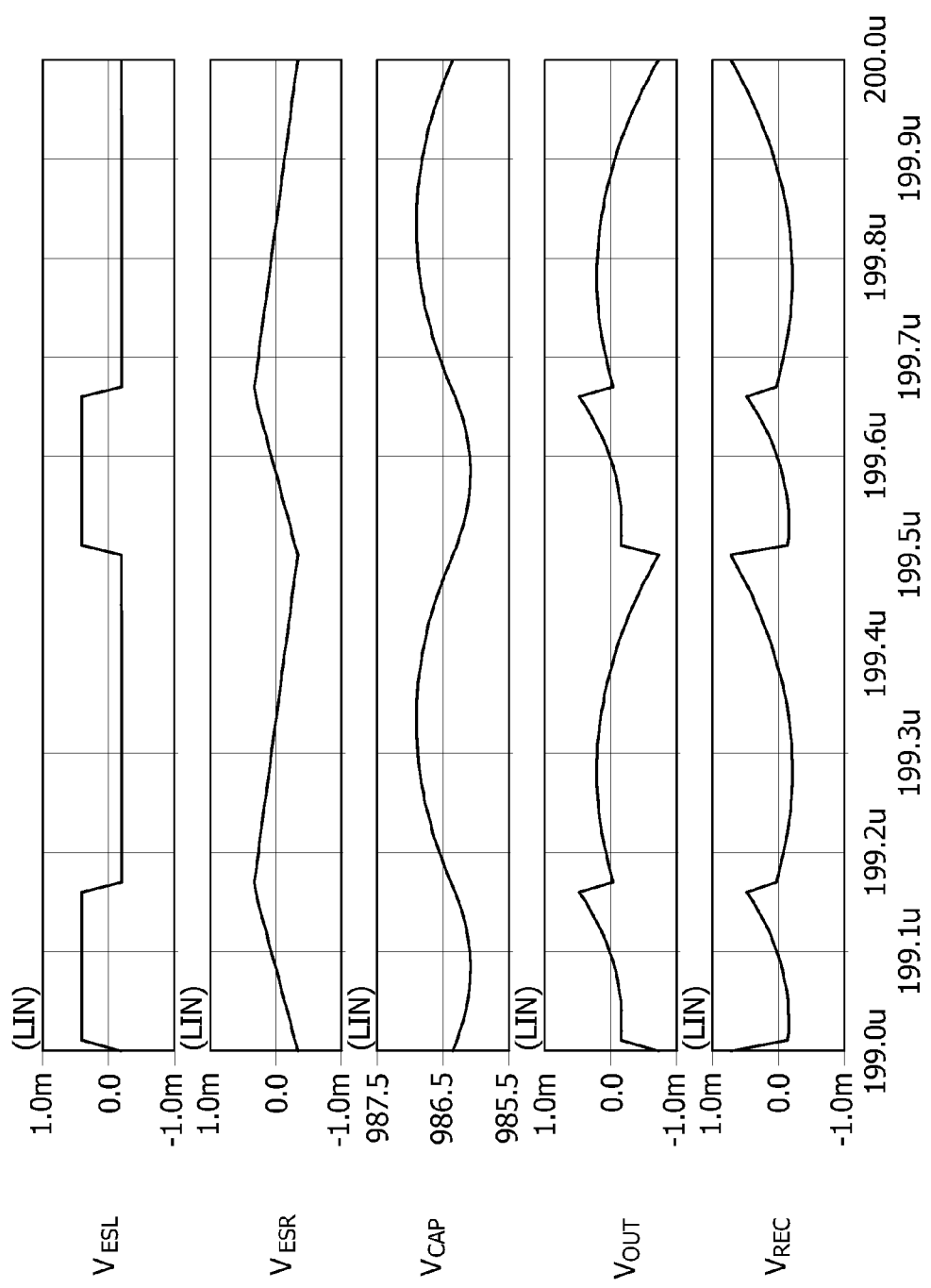
FIG. 5 shows simulation results of voltages across the inductor of the supply circuit and resulting voltages across parts of the capacitor of the supply circuit and resulting non-rectified and rectified voltages at the output of the supply circuit.

In FIG. 5, simulation results of voltages across the inductor 2 of the supply circuit 1 and resulting voltages across parts of the capacitor 4 of the supply circuit 1 and resulting non-rectified and rectified voltages (Vout and Vrec) at the output of the supply circuit 1 are shown. The four upper voltages are AC voltages, the lowest voltage is a rectified voltage.

Figure 6:
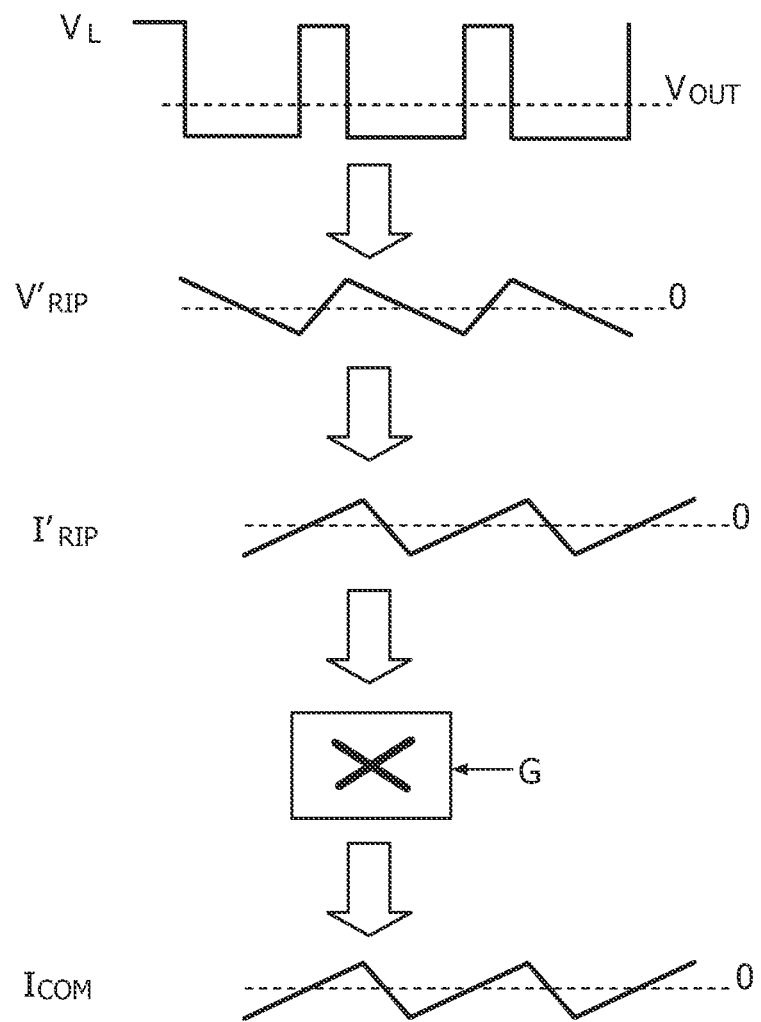
FIG. 6 shows a voltage across the inductor and a saw tooth voltage derived from this voltage across the inductor and a saw tooth current derived from the saw tooth voltage and a compensating current derived from the saw tooth current via multiplication.

In FIG. 6, a voltage across the inductor 2 (V L) and a saw tooth voltage (V'RIP) derived from this voltage across the inductor 2 and a saw tooth current (I'RIP) derived from the saw tooth voltage and a compensating current (I COM) derived from the saw tooth current via multiplication are shown. As explained and simulated before, a signal is derived from the ripple using synchronous rectification. This derived signal can be integrated and can provide a gain signal G that drives the gain unit in FIG. 6. At complete cancellation, the derived signal will be zero and the integrated value of the gain signal G will not further increase. A too high value of the compensating current would yield an inverted ripple signal and a negative value of the derived signal. As a consequence, this would yield a decrease of the gain signal G until full cancellation is obtained.

The supply circuit 1 according to the invention may be used in a single phase situation (one inductor 2) as well as in a multi phase situation with several parallel inductors that can be switched such that for example each phase has its own inductor. The several inductors may add their current into a single node together with a compensation current that are all fed to the output via a common impedance 3.

So, a prior art supply circuit that comprises an inductor 2 coupled to switching means 7 and that comprises a capacitor 4 is according to the invention provided with an impedance 3 located between the inductor 2 and the capacitor 4 and with a current injector 5 and with a feedback loop comprising a converter 6 for controlling the current injector 5 for compensating a ripple in an output voltage across the capacitor 4. The impedance 3 allows an injection of a compensating current at a location different from an output location, this increases a number of possible detections of the ripple in the output voltage and makes a distinction between the contradictory requirements towards the performance of the output capacitor 4 and required measurement sensitivity. The converter 6 measures a voltage across the impedance 3 or across a serial circuit of the impedance 3 and the capacitor 4. The impedance 3 comprises a resistor or a further inductor.

The supply circuit 1 according to the invention supplies a voltage signal between the fifth and sixth electrodes 15 and 16 and, in other words, supplies an output voltage across the capacitor 4 to a load. The method according to the invention operates the supply circuit 1 according to the invention for supplying a voltage signal between the fifth and sixth electrodes 15 and 16 and, in other words, supplying an output voltage across the capacitor 4 to a load. Therefore, in other words, the method according to the invention supplies a voltage signal between the fifth and sixth electrodes 15 and 16 and, in other words, supplies an output voltage across the capacitor 4 to a load.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A supply circuit comprising:
    an inductor comprising a first electrode coupled to switching means and comprising a second electrode,
    an impedance comprising a third electrode coupled to the second electrode and comprising a fourth electrode,
    a capacitor comprising a fifth electrode coupled to the fourth electrode and comprising a sixth electrode,
    a current injector coupled to the third electrode for compensating a ripple in a voltage signal between the fifth and sixth electrodes, and
    a feedback loop for detecting a detection signal via the impedance and for supplying a control signal to the current injector and comprising a converter for converting the detection signal into the control signal, the converter comprising an amplifier for amplifying the detection signal and comprising a rectifier for rectifying the amplified detection signal and comprising an integrator for integrating the rectified amplified detection signal, the control signal comprising the integrated rectified amplified detection signal.

2. The supply circuit as defined in claim 1, inputs of the feedback loop being coupled to the third electrode and to the fourth electrode or the sixth electrode.

3. The supply circuit as defined in claim 1, the impedance comprising a further inductor.

4. The supply circuit as defined in claim 1, the rectifier comprising a multiplier for multiplying the amplified detection signal with a duty cycle signal.

5. The supply circuit as defined in claim 1, the integrator comprising a multiplier for multiplying the rectified amplified detection signal with a saw tooth signal.

6. The supply circuit as defined in claim 1, the converter further comprising one or more high pass filters for filtering the detection signal and/or for filtering the amplified detection signal.

7. The supply circuit as defined in claim 1, wherein the switching means comprises transistors and the supply circuit being a switched mode supply circuit.

8. A device comprising the supply circuit as defined in claim 1.

* * * * *